[11] 3,598,484

[72] Inventors John David Redman
Newbury;
William Philip Wolton, Basingstoke, both of, England
[21] Appl. No. 770,664
[22] Filed Oct. 25, 1968
[45] Patented Aug. 10, 1971
[73] Assignee United Kingdom Atomic Energy Authority
London, England
[32] Priority Oct. 26, 1967
[33] Great Britain
[31] 48,842

[54] HOLOGRAPHIC METHOD
17 Claims, 13 Drawing Figs.
[52] U.S. Cl. .................................................. 355/2,
350/3.5
[51] Int. Cl. ...................................... G03b 27/42
[50] Field of Search .................................... 355/2, 3.5

[56] References Cited
OTHER REFERENCES
" Breakthrough In Holography May Open Engineering Uses," Fearing, Product Engineering, February 13, 1967, pages 28— 31.

*Primary Examiner*—Samuel S. Matthews
*Assistant Examiner*—Richard A. Wintercorn
*Attorney*—Larson, Taylor and Hinds ABSTRACT: A holographic method of producing a three-dimensional reconstruction of a scene comprises producing a plurality of representations, e.g. positive photographic transparencies, of the scene at a corresponding plurality of viewing angles relative to the scene, e.g. by moving a camera in an arc about a point in the scene, making holograms from the representations on a common photosensitive plate, each hologram being made using a nondiffused object beam directed onto the plate at an angle corresponding to the viewing angle of the representation from which is made and a reference beam directed at a constant angle onto the plate for all the holograms, and forming a reconstruction of the holograms using a reference beam directed at the same constant angle onto the plate. Preferably a divergent reference beam is used in making the holograms and a parallel reference beam is reconstructing the holograms, which allows the reconstruction to be viewed directly, without the need for a converging viewing lens.

HOLOGRAPHIC METHOD

BACKGROUND OF THE INVENTION

This invention relates to holography.

In conventional holography, the object must usually be held stationary to within a fraction of a wavelength during the exposure. This has meant that only a very restricted class of objects could be recorded holographically. Holographic reconstructions of such objects are faithful to wavelength accuracies, but such accuracies are not always needed. For example, much lower fidelity would be acceptable for three-dimensional still scenes, e.g. for portraits, or for three-dimensional television. For application such as these, the present invention provides a method of producing adequate three-dimensional reconstructions.

SUMMARY OF THE INVENTION

According to the present invention a holographic method of producing a three-dimensional reconstruction of a scene comprises producing a plurality of representations of the scene at a corresponding plurality of viewing angles relative to the scene, making holograms from said representations on a common photosensitive sheet, each said hologram being made using an object beam directed onto said sheet at an angle corresponding to the viewing angle of the representation from which is made and a reference beam directed at a constant angle onto said sheet for all said holograms, and forming a reconstruction of said holograms using a reference beam directed at said constant angle onto said sheet, said object beam being nondiffused.

Said plurality of representations may be produced at a plurality of locations at a substantially constant distance from a selected point in said scene, said point occupying substantially the same position in the field of view in each representation. Alternatively said plurality of representations may be produced at a single location using a plurality of viewing angles of the scene.

A divergent reference beam may be used in making said holograms, in which case said reconstruction may be formed using a reference beam of lesser divergence, e.g. a parallel beam, and viewed directly. Alternatively reference beams of equal divergence or parallelism may be used in making and reconstructing said holograms, in which case the reconstruction may be viewed through a converging lens. The reference beam used in reconstruction may be obtained from a mercury lamp.

The representations may be derived from reflected light, e.g., as photographic transparencies, or from transmitted radiation, e.g. X-rays.

DESCRIPTION OF THE DRAWINGS

To enable the nature of the present invention to be readily understood, attention is directed, by way of example, to the accompanying drawings, wherein:

FIGS. 5a—c are diagrams illustrating how the reconstruction is formed.

DESCRIPTION OF PREFERRED EMBODIMENT

Figure 1:
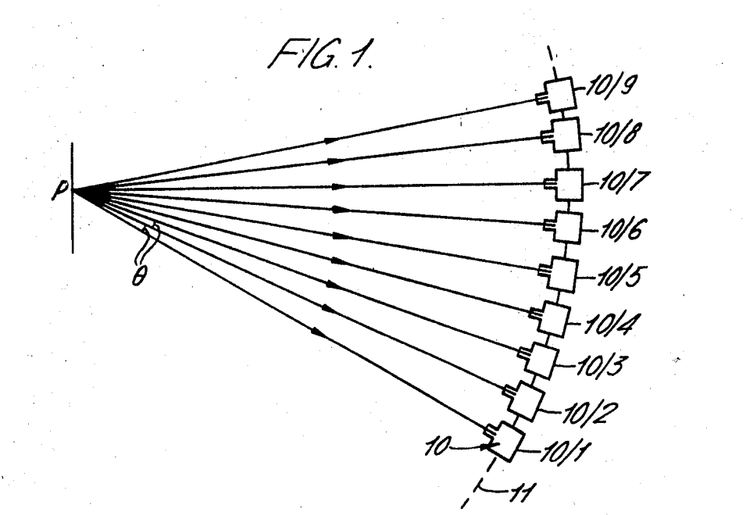
FIG. 1 is a diagrammatic plan view illustrating a representation-producing stage in one embodiment of the present method.

Referring to FIG. 1, a camera 10 is used to take a sequence of photographs at a plurality of locations 10/1—10/9 equidistant from a point P in the scene of which a three-dimensional representation is required. Normally the differences between successive viewing angles at the successive locations are made equal as shown, but this is not essential. Such photographs are conveniently taken using a 16 mm. cinecamera 10 which is moved round the arc 11 at a uniform speed taking 16 frames per second, e.g. mounted on a bar pivoted about the point P and taking a frame every one-sixth degree over an arc of 30°.

Figure 2:
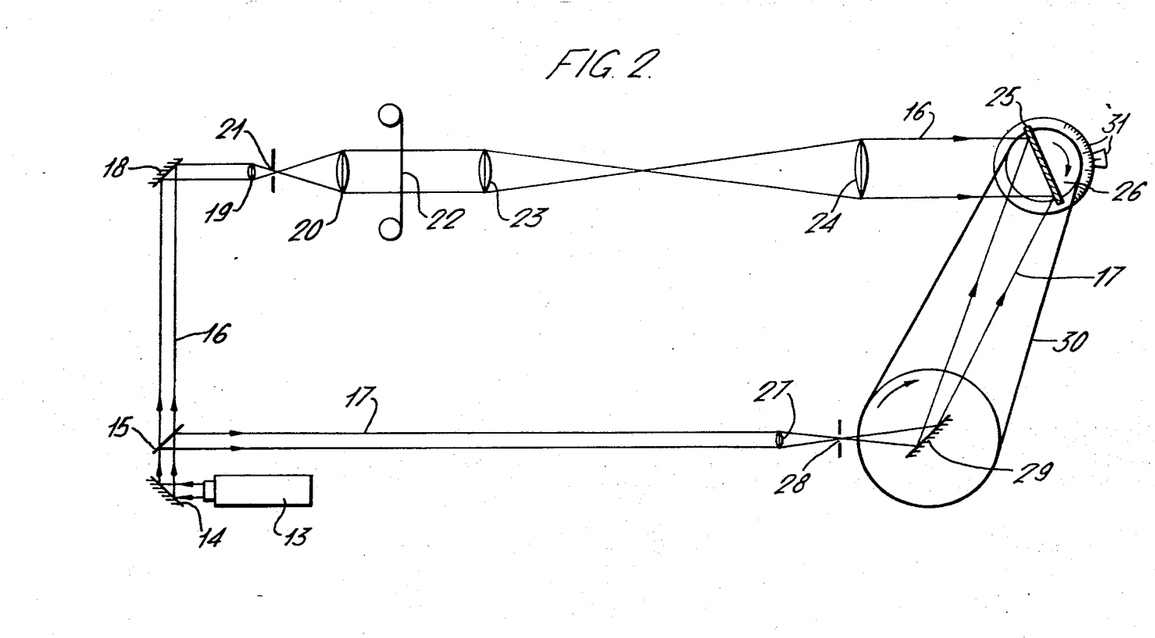
FIG. 2 is a diagrammatic plan view of apparatus for making holograms in the present method.

FIG. 2 shows how the sequence of photographic frames so produced is converted to holograms on a common photographic plate by the process sometimes known in the holographic art as multiplexing. Light from a helium-neon laser 13 is reflected from a fixed mirror 14 onto a beam splitter 15 from which an object beam 16 and a reference beam 17 are obtained. The object beam 16 is reflected from a fixed mirror 18, and apodised, broadened and collimated by lenses 19 and 20 and pinhole 21 to fill the useful aperture of each 16 mm. cineframe of the film made with camera 10. Successive frames of the film are located in the beam at 22. An afocal lens combination comprising lenses 23 and 24, e.g. of 18 cm. and 80 cm. focal length respectively, projects a magnified image of the frame onto a high-resolution photographic plate 25 (e.g. Kodak 649F) mounted on a rotatable holder 26.

The reference beam 17 is made divergent by lens 27 and pinhole 28, and reflected from a rotatable mirror 29 onto the plate 25 at an oblique angle, e.g. 22.5°. Holder 26 and mirror 29 are coupled by a belt 30 so that mirror 29 rotates at half the angular velocity of plate 25. Thus as plate 25 is rotated, reference beam 17 always strikes it at the same angle. A parallel reference beam can also be used, but a divergent beam is preferred for a reason explained hereinafter.

Holograms are made from the successive cineframes at 22 by exposing plate 25 to each in turn. Between exposures plate 25 is rotated by an amount corresponding to the angular movement of camera 10 in FIG. 1. A scale and marker arrangement 31 is associated with holder 26 for this purpose. The result is a multiplexed hologram on plate 25 of all the cinefilm frames.

A suitable degree of divergence of beam 17 is obtained with a light-path distance of 80 cm. between pinhole 28 and the center of plate 25 via mirror 29.

In the above description the film is assumed to give a positive image of the scene, but a positive transparency made from a negative film can be used.

When the developed hologram plate 25 is illuminated (FIG. 3) with a replica 17' of the reference beam 17, a multiplicity of beams is reconstructed at the plate. Each beam corresponds to a particular portion of the holographic exposure and hence is associated with a particular frame of the original cinesequence. Furthermore the beam corresponding to any given frame leaves plate 25 at an angle which corresponds to the direction the cinecamera 10 pointed in when the frame was originally exposed (FIG. 1).

Figure 3:
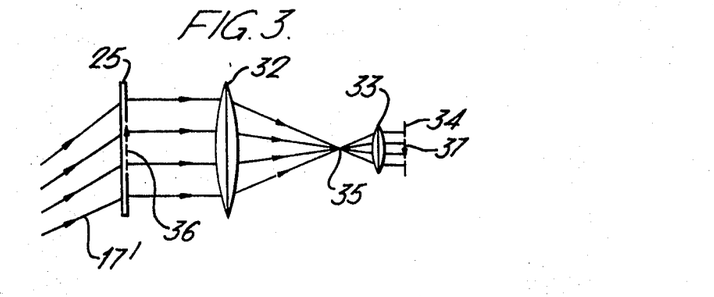
FIGS. 3 and 4 are diagrams illustrating alternative ways of viewing the hologram reconstruction.

If the original cineframes had been blank all the reconstructed waves would be plane. Because the frames are not blank, each of these plane waves is spatially modulated by the structure on the corresponding frame. When the eye intercepts one of these modulated plane waves, the eye focuses on infinity and the observer only sees a spot of light, despite the modulation. As the viewpoint is changed so that successive plane waves strike the eye, the observer sees an array of spots located at infinity—one for each of the original frames. In FIG. 3, however, a converging lens 32 is placed between the observer and the hologram plate 25. Each modulated plane wave then strikes the converging lens and is brought to a focus in its focal plane. It now becomes possible for an observer to see any structure present on the original frames. For example, if the eye is placed so that the back focal plane of lens 32 coincides at 35 with the front focus of the relaxed eye lens 33, the light is recollimated and a spatially modulated plane wave falls on the retina 34. The observer then sees the structure on the original frame (e.g. object 36 at 37). Even if the eye is moved further back or focused, the structure is still seen though on a different scale. Lens 32 is placed as close as possible to hologram 25 and is typically of 100 cm. focal length.

The structure on the retina resembles a contact print of the original frame. If the eye is moved to another viewpoint so as to accept another reconstructed wave, another quasi-contact print is formed on the retina. As the observer moves from one reconstructed wave to another, he sees a succession of views of the original scene., However if the angular interval between the waves leaving the hologram is made small, several can enter the eye at any given viewing position and several "contact prints" will be formed simultaneously on the retina. The observer can then select a feature which is common to them all and focus on it almost as if he were viewing the original scene. If the geometry of the system is arranged so that at any given viewpoint at least two reconstructed waves enter the eye, a continuous three-dimensional view of the scene is produced.

Figure 4:
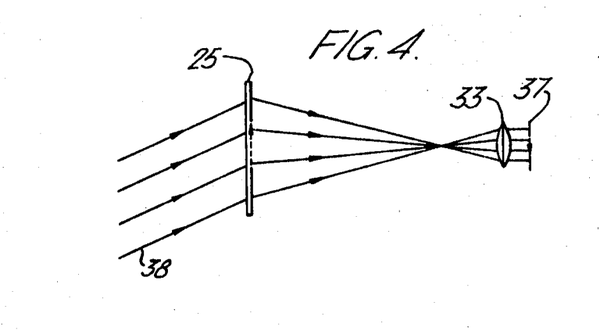

FIG. 4 illustrates an alternative and preferred method of reconstruction. The hologram 25 is made using a divergent reference beam as described with reference to FIG. 2, but the reference beam 38 used in reconstruction is a parallel beam inclined to the plate at the same angle as was the divergent beam. This is a more convenient viewing arrangement in that the desired positive curvature is superimposed on all the reconstructed waves without the need for lens 32. For this reason the use of a divergent reference beam when making the holograms is preferred.

Figures 5A, 5B, 5C:
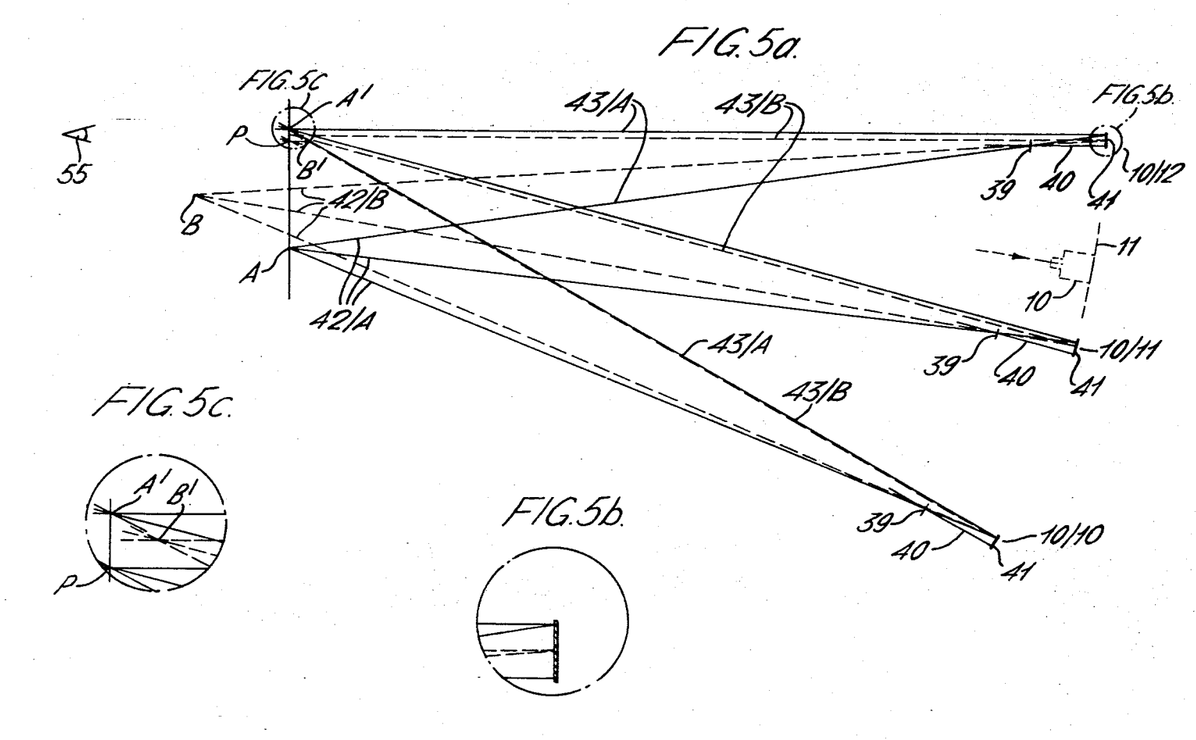

FIG. 5a shows in more detail how the reconstruction is formed. Two points A and B in a scene are identified and three positions 10/10, 10/11 and 10/12 of the camera 10 are shown, spaced on an arc having its center at point P in the scene. For clarity the camera lens is not shown in detail, but its position is indicated at 39 and its axis by the lines c. Lines 42/A and 42/B drawn from A and B respectively through lens 39 indicate where these points are projected onto the film 41 at each camera position. FIG. 5b shows this on an enlarged scale. The formation of the holograms and their subsequent reconstruction are represented by the lines 43/A and 43/B leaving the projected points in a direction parallel to the axis 40 of the camera lens. The reconstruction positions of points A and B are indicated at A' and B' respectively and shown on an enlarged scale in FIG. 5c.

The transparencies are assumed to be taken from the right-hand side of P (camera 10 moving on arc 11), and on reconstruction the eye 55 is assumed to view the hologram plate from the left-hand side of P with the plate illuminated by reference beam 17' (not shown) from the right-hand side.

So long as the distance to the camera is large compared with the distance of points in the scene from the center of rotation of the camera, all the reconstructed rays from a particular object point meet at a conjugate reconstruction point and the original scene is reconstructed on a reduced scale, all dimensions being reduced in the same proportion. This is shown by the following calculation.

Figures 6, 8:
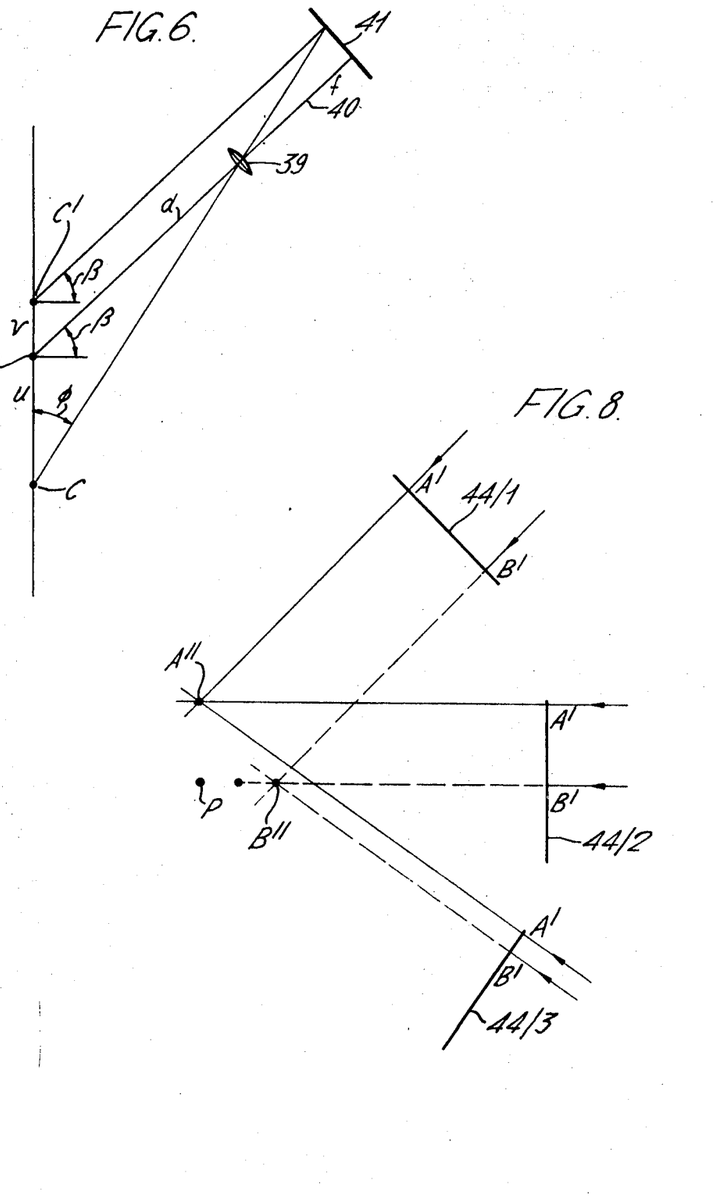
FIG. 6 is a diagram illustrating how the location of the reconstruction is determined.
FIGS. 7 and 8 illustrate the production of X-ray representations and their holographic reconstruction.

FIG. 6 shows an arbitrary point C on an original scene and also the center of rotation P about which the camera moved. If $f$ is the focal length of the camera lens 39, $d$ is its distance from the center of rotation P, $\Phi$ is the angle between a ray leaving the arbitrary point C and the line joining the point to the center of rotation, $v$ is the distance on the opposite side of the center of rotation at which the ray crosses the line and $u$ is the distance of the arbitrary point from the center of rotation, then simple geometry shows that $$v = \frac{uf}{d} \cdot \frac{1}{1 \pm \sqrt{\left[1 - \frac{1-(u/d)^2}{1-(u/d)^2 \sin^2 \phi}\right]}} \cdot \frac{1}{1-(u/d)^2 \sin^2 \phi}$$

where the positive sign applies when $0 < \Phi < \pi/2$ and the negative sign applies when $\pi/2 < \Phi < \pi$ It will be seen that when $(u/d)^2 \ll 1$, $v$ tends to $uf/d$ i.e. $v$ is independent of $\Phi$. So all the rays leaving the arbitrary point C cross the line joining it to the center of rotation P at a distance $v$, i.e. at point C'. The latter is therefore the point of intersection of all rays leaving point C i.e. is a reconstruction of the point C. This means that the scale of the reconstruction is reduced in the ratio $f/d$.

The above expression applies when there is no magnification between the initial photography and the holographic multiplexing. When magnification M is introduced the effective focal length is $Mf$.

In FIGS. 5a—c it is assumed that the cineframe positions lie on a circle whose center P is on the hologram plate. This causes the point about which the camera was rotated to be reconstructed in the plane of the hologram. By adjusting the geometry of the system it is possible to position the reconstruction either in front of the hologram plate or behind it.

It may be noted that in FIGS. 5a—c, the reconstruction has apparently been produced without the aid of a converging lens 32 (FIG. 3) or of a parallel reference beam (FIG. 4). This reconstruction would not however be viewable by the eye because too few of the reconstructed rays are capable of entering it at any one time. The lens 32 placed close to the hologram plate acts as a field lens and ensures that more of the rays can enter the eye; it does not, however appreciably alter the position of the reconstruction. A parallel reference beam has the same effect.

Improved reconstruction is obtained by illuminating the hologram with light from a mercury lamp instead of a laser. The mercury lamp, being an extended source, produces a multiplicity of reconstructions of each transparency. Hence any unevenness in the three-dimensional view is smoothed out. This allows the illusion of three dimensions to be produced with fewer exposures. For example an angular interval of one-third degree is acceptable when using the extended source compared with one-sixth degree with laser light. Typically the mercury lamp is placed in the focal plane of a 75 cm. lens to produce an approximately parallel beam. The hologram is placed at the other side of the lens at a distance of about 15 cm. and viewed from a distance of about 100 cm. A filter is preferably placed between the hologram and the lamp to isolate the mercury green line.

Figure 7:
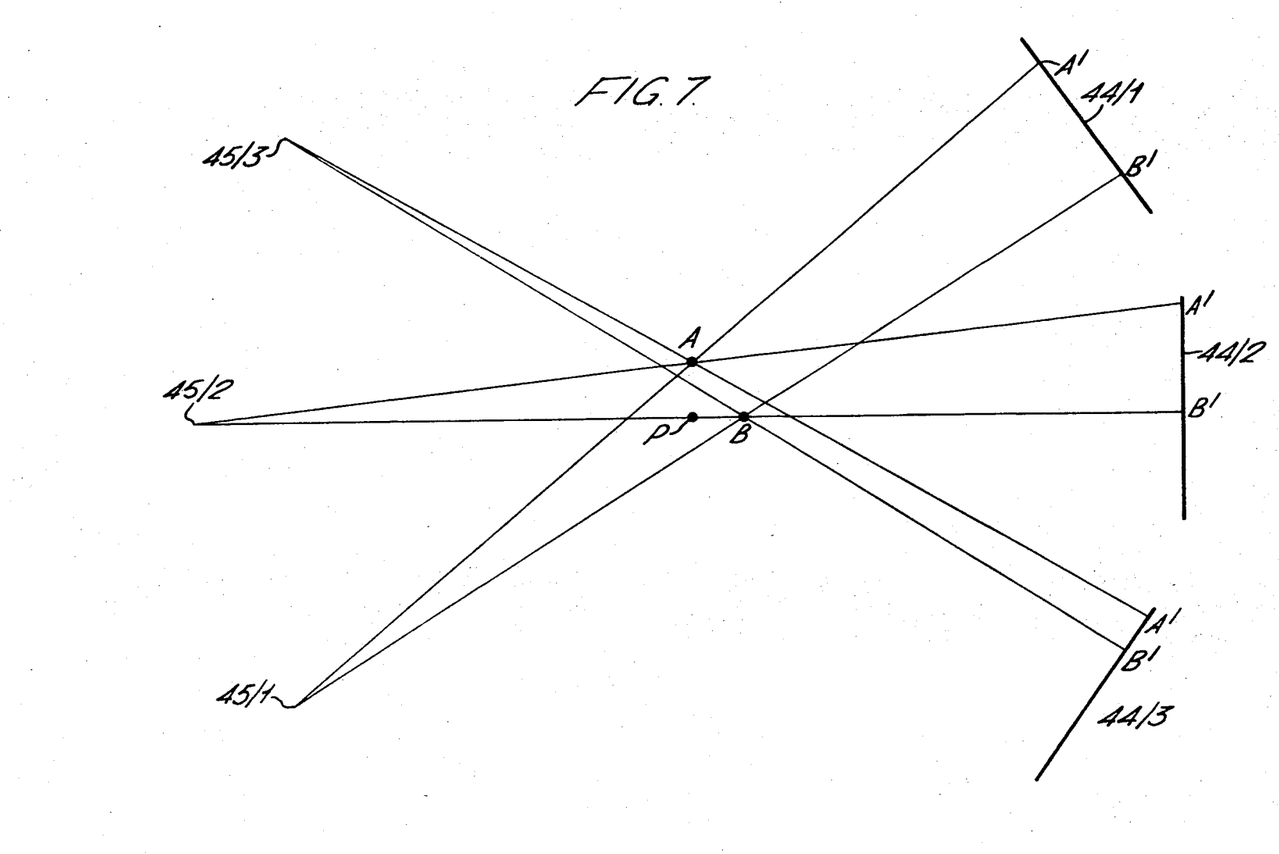

The present method can also be used to produce three-dimensional X-ray pictures of a scene (e.g. a patient), as shown in FIGS. 7 and 8. The first step is to take a sequence of radiographs from different viewpoints, and this is conveniently done using a cinecamera which photographs the television monitor screen of an image-intensifier X-ray system. All the photographs are then multiplexed onto one hologram plate in the manner described with reference to FIG. 2. For clarity, it is assumed in FIGS. 7 and 8 that the radiographs are recorded directly onto plates, and the latter method can in fact be used as an alternative. In FIG. 7, two points A and B in a patient are identified and three positions of the X-ray equipment are shown. Lines drawn from the X-ray source 45 at the three positions 45/1, 45/2 and 45/3 through points A and B indicate where the latter are projected, at A' and B', onto the X-ray plates 44 at each of the three positions 44/1, 44/2 and 44/3.

The center of rotation of X-ray source and plates about the patient is shown at P. The production of the holograms on a single plate and their subsequent reconstruction at A'' and B'' are represented in FIG. 8, these processes being similar to those hereinbefore described for ordinary photographs. It will be observed that there is a doubling in scale of the reconstruction compared to the original. Any desired scale can be produced by introducing magnification prior to the multiplexing stage, and by adjusting the geometry of the arrangement it is possible to locate the reconstruction either in front of the hologram plate or behind it. In one application of the method 60 radiographs taken over an arc of 30° were employed.

Figure 9:
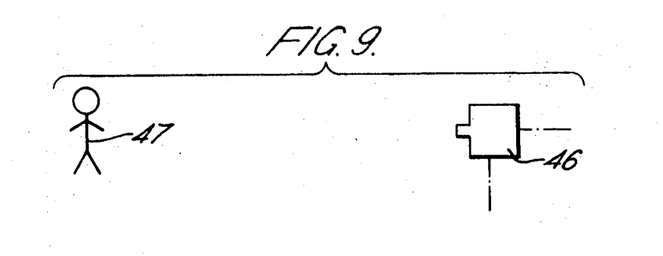
FIGS. 9, 10, and 11 illustrate modified forms of the invention.
Figure 10:
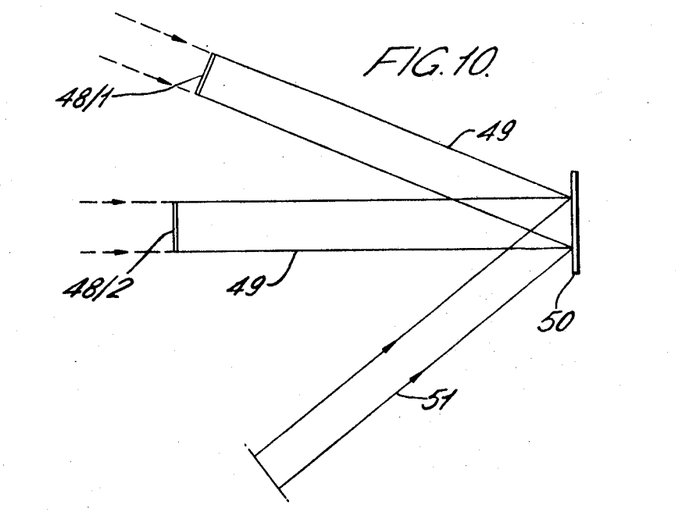
Figure 11:
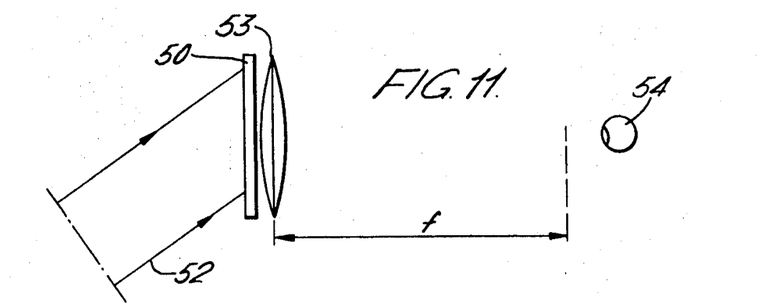

FIGS. 9, 10 and 11 illustrate modified forms of the invention. In FIG. 9 the camera 46 occupies a fixed position relative to an object 47 in the scene, and the successive photographs are produced by panning and/or tilting the camera at the fixed position. The multiplexing of the resulting transparencies is illustrated in FIG. 10. Each transparency in turn, of which 48/1 and 48/2 represent two, is so mounted relative to the hologram plate 50 that the object beam 49 normal to the transparency strikes the hologram plate 50 at an angle corresponding to the pan or tilt angle in which the camera pointed when the transparency was made. The angle which the reference beam 51 makes with plate 50 is constant. In FIG. 10 a parallel reference beam is shown, but a divergent reference beam, as already described, is preferred. FIG. 11 shows the reconstruction effected using a parallel reference beam 52 and a converging lens 53, with the eye 54 located beyond the focal length $f$ of the lens 53 as already described. If the reference beam 51 is divergent and the beam 52 parallel, the lens 53 is omitted, as earlier explained. If beams 51 and 52 have similar divergence, lens 53 is still required.

Although in FIG. 2 the beam 16 is shown as parallel both at the transparency position 22 and between lens 24 and plate 25, this is not essential. The beam 16 at plate 25 can be made divergent, as by omitting lens 24 and moving lens 23 closer to plate 25 to produce an inverted image of the film content thereat. In this case the divergence of the reference beam 17 must be made greater than that of the object beam 16 in order to produce the desired convergence when a less divergent or parallel reference beam 38 (FIG. 4) is used in reconstruction.

It will be observed that, unlike some hologram-making processes, the light used to illuminate the successive transparencies (beam 16) at 22 is nondiffused. As a result, the observer does not see on reconstruction a series of superimposed views (rather like a pack of cards), as might have been expected and which would be the case if diffused illumination were used.

The three-dimensional reconstructions obtained with the present invention are much easier to view than those obtained using stereopairs. There is no difficulty in fusing the views seen by the two eyes to produce a three-dimensional effect. In addition monocular parallax exists so that apparatus using the present method can be used by anyone, even by someone with only one eye.

A second advantage is the ease with which objects such as "floating marks" can be inserted into the reconstructed scene. A pin for example can be positioned inside the reconstruction of a solid object without interfering at all with the reconstruction process. This is because the light from the reconstruction need not cross the space in which the reconstruction appears to be formed. If more convenient, a holographic reconstruction of a pin may be inserted into the reconstructed scene. By manipulating the two hologram plates relative to one another one can make measurements on the scene.

Further advantages accrue if instead of putting a pin or a reconstruction of a pin inside the reconstructed scene more complicated objects are inserted. For example a ruler may be immersed in the reconstruction. This enables rough measurements to be made on the reconstruction directly.

We claim:

1. A holographic method of producing a three-dimensional reconstruction of a scene comprising producing a plurality of representations of the scene at a corresponding plurality of viewing angles relative to the scene, making holograms from said representations on a common photosensitive sheet, each said hologram being made using a nondiffused object beam directed onto said sheet at an angle corresponding to the viewing angle of the representation from which is made and a reference beam directed at a constant angle onto said sheet for all said holograms, and forming a reconstruction of said holograms using a reference beam directed at said constant angle onto said sheet.

2. A method as claimed in claim 1 wherein said plurality of representations is produced at a plurality of locations at a substantially constant distance from a selected point in said scene, said point occupying the same position in the field of view in each representation.

3. A method as claimed in claim 1 wherein said plurality of representations is produced at a single location using a plurality of viewing angles of the scene.

4. A method as claimed in claim 1 wherein a divergent reference beam is used in making said holograms.

5. A method as claimed in claim 4 wherein said reconstruction is formed using a reference beam which is less divergent than the reference beam used in making said holograms, whereby said reconstruction may be viewed directly.

6. A method as claimed in claim 5 wherein said reference beam used in reconstruction is substantially parallel.

7. A method as claimed in claim 1 wherein a substantially parallel reference beam is used in making said holograms.

8. A method as claimed in claim 7 wherein said reconstruction is formed using a substantially parallel reference beam, whereby said reconstruction may be viewed through a converging lens.

9. A method as claimed in claim 5 wherein said reference beam used in reconstruction is obtained from a mercury lamp.

10. A method as claimed in claim 1 wherein the representations are photographic transparencies derived from light reflected from the scene.

11. A method as claimed in claim 1 wherein the representations are derived from radiation transmitted through the scene.

12. A method as claimed in claim 4 wherein the object beam is also divergent, the reference beam used in making said holograms having greater divergence than the object beam and said reconstruction being formed using a reference beam which is less divergent than the reference beam used in making said holograms, whereby the reconstructed waves converge and may be viewed directly.

13. A method as claimed in claim 11 wherein the representations are radiographs of an object, each radiograph being produced by locating the object on a line between a radiographic source and a sheet sensitive to the radiation from said source, and rotating the line, relative to the object, through an angle between the exposures of successive sheets to said radiation, so that each radiograph represents a different angular view through the object.

14. A translucent sheet having recorded thereon a plurality of holograms produced from a corresponding plurality of representations of a scene at a corresponding plurality of viewing angles relative to the scene, each said hologram being made using a nondiffused object beam directed onto said sheet at an angle corresponding to the viewing angle of the representation from which is made and a reference beam directed at a constant angle onto said sheet for all said holograms, said reference beam being divergent.

15. A translucent sheet having recorded thereon a plurality of holograms produced from a corresponding plurality of representations of a scene at a corresponding plurality of viewing angles relative to the scene, each said hologram being made using a nondiffused object beam directed onto said sheet at an angle corresponding to the viewing angle of the representation from which is made and a reference beam directed at a constant angle onto said sheet for all said holograms, said reference beam being parallel.

16. Apparatus for producing a translucent sheet having recorded thereon a plurality of holograms produced from a corresponding plurality of representations of a scene at a corresponding plurality of viewing angles relative to the scene, each said hologram being made using a nondiffused object beam directed onto said sheet at an angle corresponding to the viewing angle of the representation from which is made and a reference beam directed at a constant angle onto said sheet for all said holograms, said apparatus comprising means for mounting a plurality of transparencies successively in a nondiffused coherent light beam, a rotatable holder for a photosensitive sheet, means for projecting an object beam comprising the image on each transparency onto the sheet held on said rotatable holder, and means for simultaneously projecting a coherent reference beam onto the sheet, said reference-beam-projecting means being so linked to said rotatable holder that as the holder is rotated the angle which the reference beam makes with the sheet remains constant.

17. Apparatus as claimed in claim 16 wherein said reference-beam-projecting means is arranged to provide a divergent reference beam.